United States Patent
Pattok et al.

(10) Patent No.: US 11,819,962 B2
(45) Date of Patent: Nov. 21, 2023

(54) TORSION BAR ACTIVE LENGTH CONTROL AND METHOD OF MANUFACTURING

(71) Applicant: Steering Solutions IP Holding Corporation, Saginaw, MI (US)

(72) Inventors: Eric D. Pattok, Frankenmuth, MI (US); Sai Saagar Adimulam, Saginaw, MI (US); Mark A. Wolfer, East Lansing, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 200 days.

(21) Appl. No.: 17/212,819

(22) Filed: Mar. 25, 2021

(65) Prior Publication Data

US 2021/0205937 A1 Jul. 8, 2021

Related U.S. Application Data

(62) Division of application No. 15/915,903, filed on Mar. 8, 2018, now Pat. No. 11,020,827.

(51) Int. Cl.
| | |
|---|---|
| *B23P 15/00* | (2006.01) |
| *B23B 5/08* | (2006.01) |
| *F16C 1/08* | (2006.01) |
| *F16D 1/10* | (2006.01) |
| *B21J 5/12* | (2006.01) |

(Continued)

(52) U.S. Cl.
CPC .............. *B23P 15/00* (2013.01); *B21J 5/12* (2013.01); *B21K 1/066* (2013.01); *B21K 1/12* (2013.01); *B23B 5/08* (2013.01); *F16C 1/08* (2013.01); *F16D 1/10* (2013.01); *B21K 1/76* (2013.01); *B62D 1/16* (2013.01); *F16C 2326/24* (2013.01); *F16D 2001/103* (2013.01); *Y10T 29/49609* (2015.01); *Y10T 403/7026* (2015.01)

(58) Field of Classification Search
CPC . B23P 15/00; B21J 5/12; B21K 1/066; B21K 1/12; B21K 1/76; B23B 5/08; F16C 1/08; F16C 2326/24; F16D 1/10; F16D 2001/103; B62D 1/16; Y10T 29/49609; Y10T 403/7026
USPC ........................................... 72/338; 29/896.9
See application file for complete search history.

(56) References Cited

U.S. PATENT DOCUMENTS

| | | | |
|---|---|---|---|
| 2,588,018 A | * | 3/1952 | Lauenstein ............... F16F 1/14 464/97 |
| 3,131,554 A | | 5/1964 | Hornschuch et al. |

(Continued)

FOREIGN PATENT DOCUMENTS

| | | |
|---|---|---|
| EP | 0916565 A1 | 5/1999 |
| WO | 2011009169 A1 | 1/2011 |

OTHER PUBLICATIONS

Official Letter regarding corresponding EP App. No. 19 161 070.8; dated Jun. 27, 2022.

*Primary Examiner* — Greg Binda
(74) *Attorney, Agent, or Firm* — Dickinson Wright PLLC

(57) ABSTRACT

A method of manufacturing a torsion bar includes cutting a stock torsion bar material to a desired torsion bar length to form the torsion bar. The method also includes forming a first end portion by removing material from the torsion bar to form a first annular groove extending circumferentially about the torsion bar. The method further includes forming a second end portion by removing material from the torsion bar to form a second annular groove extending circumferentially about the torsion bar.

2 Claims, 4 Drawing Sheets

(51) Int. Cl.
*B21K 1/06* (2006.01)
*B21K 1/12* (2006.01)
B62D 1/16 (2006.01)
B21K 1/76 (2006.01)

(56) References Cited

U.S. PATENT DOCUMENTS

| | | |
|---|---|---|
| 5,667,330 A | 9/1997 | Henkel et al. |
| 7,159,434 B2 * | 1/2007 | Yoshimura ............... B21K 1/76 |
| 2013/0102399 A1 | 9/2013 | Kim |

* cited by examiner

TORSION BAR ACTIVE LENGTH CONTROL AND METHOD OF MANUFACTURING

CROSS-REFERENCE TO RELATED APPLICATION

This application is a divisional application of, and claims the benefit of priority to, U.S. patent application Ser. No. 15/915,903, filed Mar. 8, 2018, now U.S. Pat. No. 11,020,827, issued Jun. 1, 2021, the disclosure of which is incorporated by reference herein in its entirety.

FIELD OF THE INVENTION

The subject invention relates to torsion bars, and more particularly, to a torsion bar for a power steering assembly, as well as a method for forming such torsion bars.

BACKGROUND OF THE INVENTION

A power steering assembly of a vehicle may include a power assisted device that facilitates the turning of a steering wheel by a vehicle operator. In order to achieve the function of the power steering, it may be necessary to provide a torsion bar which has a primary function of being a torsion spring providing a specified torsional stiffness in order to facilitate the measuring of the vehicle operator input torque. Typically, the geometry of a torsion bar is a circular cross-section in a mid-portion and serrated (i.e., splined) on end portions thereof. The splines are pressed with interference into two separate mating components. Intersection of the torsion bar and the mating components often has significant length variation. This is attributed to three distances adding to the manufacturing stack. In particular, the length of each bore's entrance to the intersection point of each splined portion and the distance between the bore entrances each add to the stack. In some assemblies, hole depths and the assembly gap tolerances are each 0.5 millimeters, for example, thereby leading to a shortest and longest active length of the torsion bar varying by 3.0 millimeters. Smaller variation would be desirable.

SUMMARY OF THE INVENTION

According to an aspect of the disclosure, a torsion bar includes a central portion extending in an axial direction about a longitudinal axis. The torsion bar also includes a first end portion having a splined outer surface, the first end portion disposed proximate a first end of the torsion bar, the first end portion spaced from the central portion with a first annular groove extending circumferentially about the torsion bar.

According to another aspect of the disclosure, a torsion bar assembly for a steering column is provided. The torsion bar assembly includes a first shaft having a first bore defined therein, the first bore having a first bore diameter section and a second bore diameter section, the first bore diameter section and the second bore diameter section joined by a first transition region. The torsion bar assembly also includes a second shaft having a second bore defined therein, the second bore having a first bore diameter section and a second bore diameter section, the first bore diameter section and the second bore diameter section joined by a second transition region. The torsion bar assembly further includes a torsion bar. The torsion bar includes a central portion extending in an axial direction about a longitudinal axis. The torsion bar also includes a first end portion having a splined outer surface, the first end portion disposed proximate a first end of the torsion bar, the first end portion spaced from the central portion with a first annular groove extending circumferentially about the torsion bar, an outer end of the first transition region axially positioned within the length of the first annular groove. The torsion bar further includes a second end portion having a splined outer surface, the second end portion disposed proximate a second end of the torsion bar, the second end portion spaced from the central portion with a second annular groove extending circumferentially about the torsion bar, an outer end of the second transition region axially positioned within the length of the second annular groove.

According to yet another aspect of the disclosure, a method of manufacturing a torsion bar is provided. The method includes cutting a stock torsion bar material to a desired torsion bar length to form the torsion bar. The method also includes forming a first end portion by removing material from the torsion bar to form a first annular groove extending circumferentially about the torsion bar. The method further includes forming a second end portion by removing material from the torsion bar to form a second annular groove extending circumferentially about the torsion bar.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, illustrated is a torsion bar for use in a torsion bar assembly. Power steering systems may incorporate a torsion bar in hydraulic and electric actuators. The torsion bar typically facilitates measurement of driver torque by sensing the deflection of the torsion bar and radial movement of the input shaft relative to the output shaft. In addition, the torsion bar also provides the necessary torque coupling between the driver the rest of the steering system, thus providing a desired tactile "feel" to the user. As will be appreciated from the description herein, the disclosed torsion bar includes features that reduce the active length variation which in turn reduces the spring rate variation of the torsion bar. Active length variation refers to a length of the torsion bar that functions as a torsional spring, whereas end portions outside of the active length portion are fixed and do not act as a spring. Additionally, the manufacturing process employed to form the torsion bar disclosed herein is significantly simplified and less costly.

Figure 1:
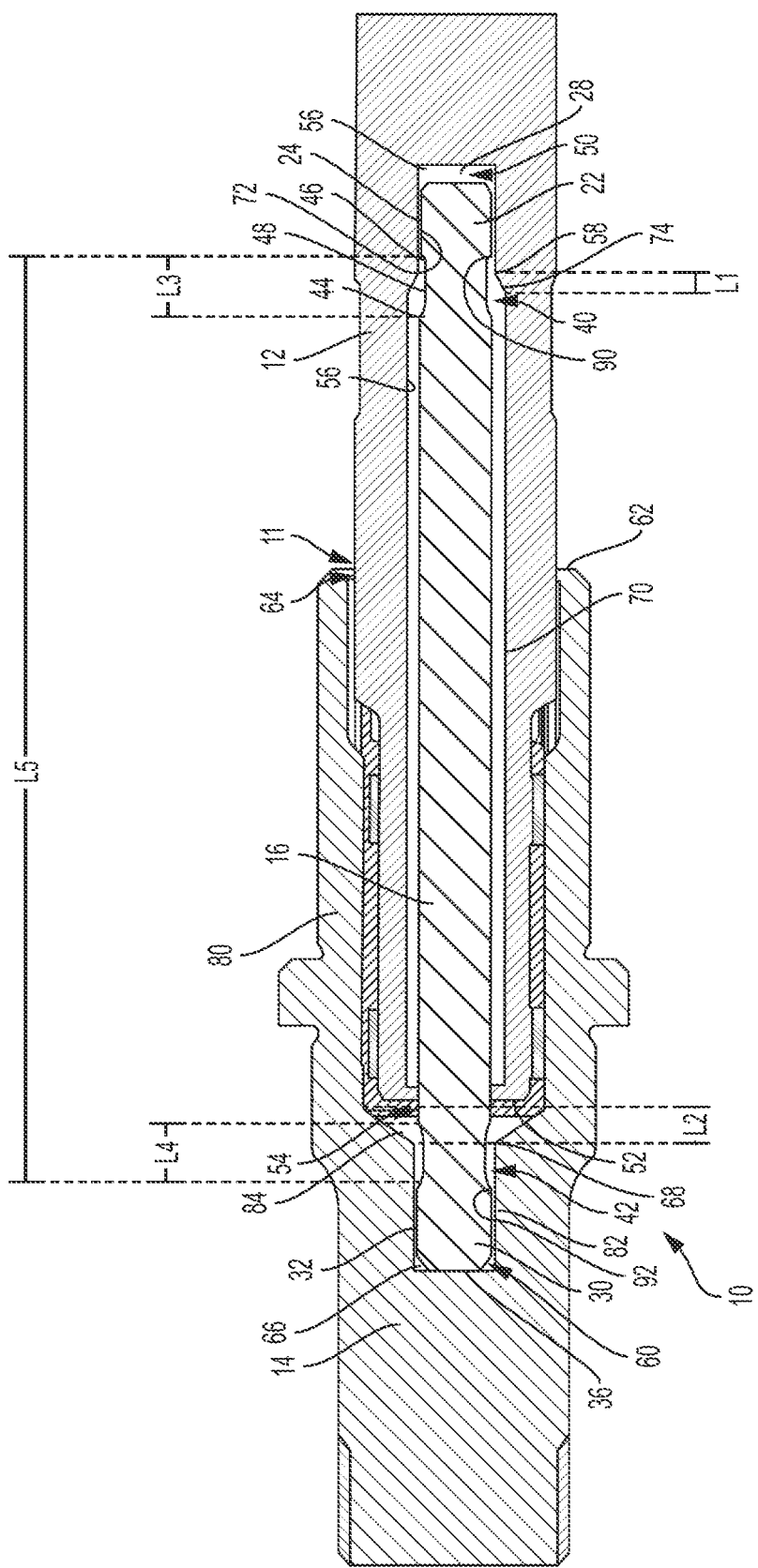
FIG. 1 is a sectional view of a torsion bar assembly of a steering column.

Referring now to FIG. 1 a portion of a steering column assembly 10 is illustrated. In particular, a torsion bar assembly 11 that is part of the steering column assembly is shown. The torsion bar assembly 11 includes an input shaft 12, also referred to herein as a first shaft. The input shaft 12 is operatively coupled to a steering input device, such as a steering wheel (not shown), and rotates in response to rotation of the steering wheel by a user. The input shaft 12 is operatively coupled to an output shaft 14, also referred to herein as a second shaft, with a torsion bar 16, as will be further described below. Upon final assembly, the torsion bar 16 imparts a torque on the steering input device that provides a tactile response to the driver and assists in measurement of torque and position of steering column components.

Figure 2:
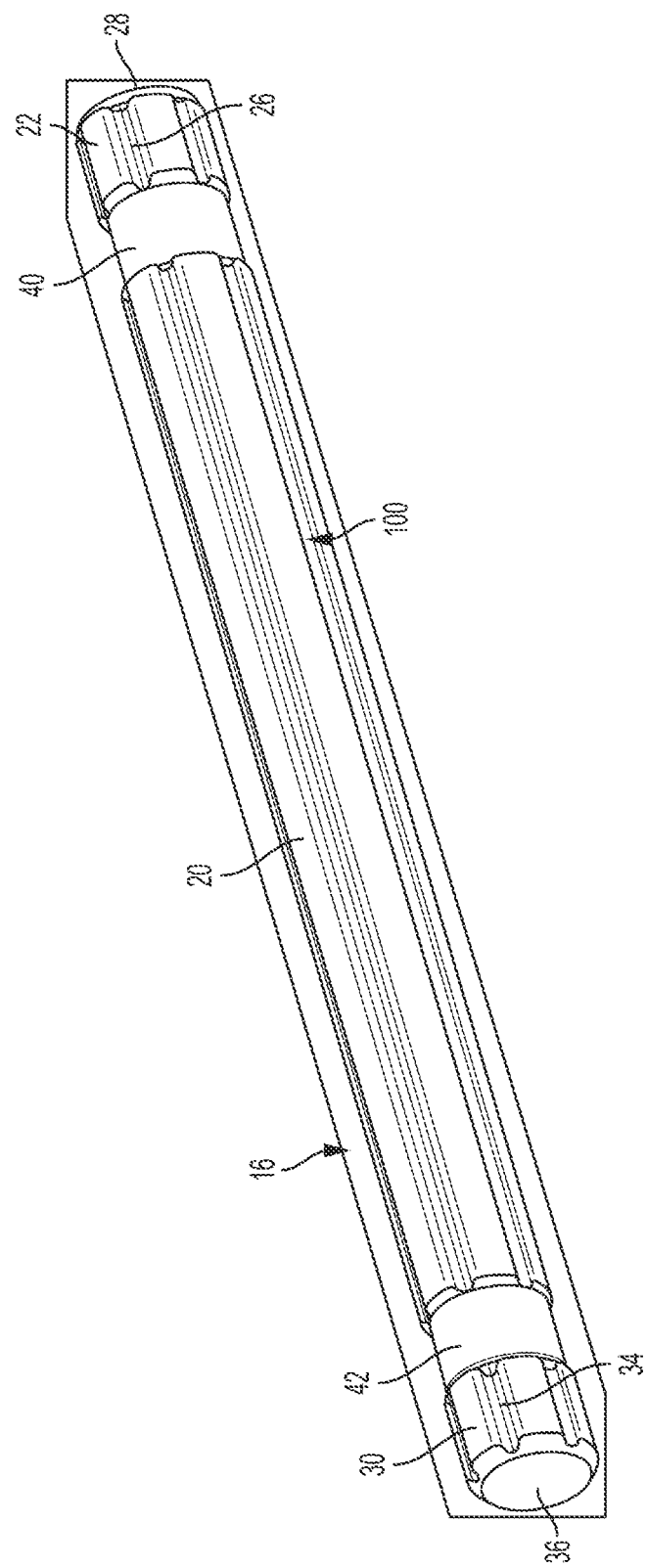
FIG. 2 is a perspective view of a torsion bar.

Referring now to FIGS. 1 and 2, the torsion bar 16 includes a central portion 20 extending in an axial direction along a longitudinal axis A of the torsion bar 16. The torsion bar 16 also includes a first end portion 22 having a splined outer surface 24. The splined outer surface 24 is defined by a plurality of serrations and splines 26 formed in the outer surface. The first end portion 22 is located proximate a first end 28 of the torsion bar 16. In some embodiments, the splined outer surface 24 extends completely to the first end 28 of the torsion bar 16. Similarly, the torsion bar 16 includes a second end portion 30 having a splined outer surface 32. The splined outer surface 32 is defined by a plurality of serrations and splines 34 formed in the outer surface. The second end portion 30 is located proximate a second end 36 of the torsion bar 16. In some embodiments, the splined outer surface 32 extends completely to the second end 36 of the torsion bar 16.

The first end portion 22 is spaced from the central portion 20 with a first annular groove 40 extending circumferentially about the torsion bar 16. The first annular groove 40. The second end portion 30 is spaced from the central portion 20 with a second annular groove 42. In some embodiments, one or both of the annular grooves 40, 42 extend completely around the circumference of the torsion bar 16. The first and second annular grooves 40, 42 are each defined by a respective first side wall 44, a second side wall 46 and a base wall 48, the base wall 48 being oriented perpendicularly relative to the first side wall 44 and the second side wall 46. In some embodiments, one or both of the side walls 44, 46 is oriented as an angled chamfer or as arcs.

The first end portion 22 is inserted into a bore 50 of the input shaft 12. The bore 50 extends from an end 52 of the input shaft 12, such that the end 52 defines an opening 54 to receive the torsion bar 16. The torsion bar 16 is coupled to the input shaft 12 by press fitting the torsion bar 16 into the bore 50, specifically by press fitting the splined outer surface 24 of the first end portion 22 with a wall 56 defining the bore 50, the press fitting placing the torsion bar 16 into an interference condition with the input shaft 12. The torsion bar 16 extends out of the bore 50 in a protruding manner. The torsion bar 16 is also inserted into a bore 60 of the output shaft 14. The bore 60 extends from an end 62 of the output shaft 14, such that the end 62 defines an opening 64 to receive the torsion bar 16. The torsion bar 16 is coupled to the output shaft 14 by press fitting the torsion bar 16 into the bore 60, specifically by press fitting the splined outer surface 32 of the second end portion 30 with a wall 66 defining the bore 60, the press fitting placing the torsion bar 16 into an interference condition with the output shaft 14. The torsion bar 16 extends out of the bore 60 in a protruding manner.

The wall 56 defining bore 50 of the input shaft 12 includes a first outer diameter section 70 and a second outer diameter section 72. As shown, second outer diameter section 72 defines a diameter smaller than the first outer diameter section 70. The first outer diameter section 70 and the second outer diameter section 72 are joined by a first transition region 74, the first transition region 74 extending along a first transition region axial length L1. Similarly, the wall 66 defining bore 60 of the output shaft 14 includes a first bore diameter section 80 and a second bore diameter section 82. As shown, the first bore diameter section 80 defines a diameter greater than the second bore diameter section 82. The first bore diameter section 80 and the second bore diameter section 82 are joined by a second transition region 84, the second transition region 84 extending along a second transition region axial length L2.

The axial length of the first annular groove 40 is referred to with L3. The axial length of the second annular groove 42 is referred to with L4. The active length is referred to with L5 and extends from an outer axial end 90 of the first annular groove 40 to an outer axial end 92 of the second annular groove 42. Edge 58 of shaft 12 is designed to be axially located in the annular groove 40 specified by length L3. Edge 68 of shaft 14 is designed to be axially located in the annular groove 42 specified by L4. The above-stated condition of edges 58 and 68 is necessary in order for the active length L5 of the torsion bar 16 to be the only dimension to affect the spring rate of the torsion bar 16.

Figure 4:
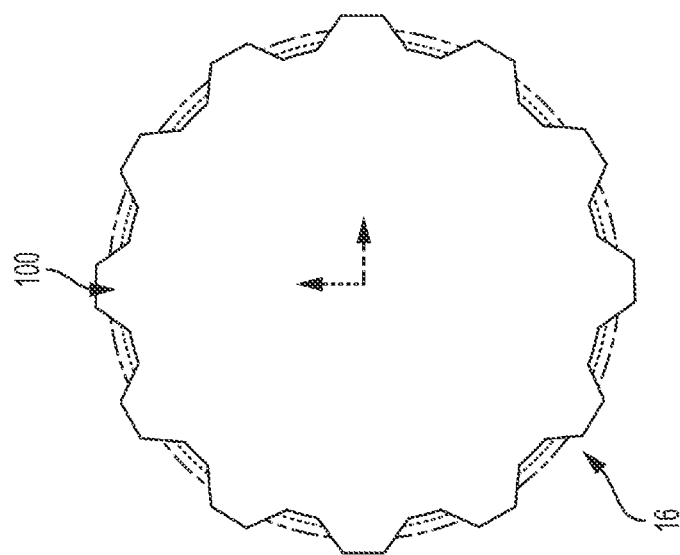
FIG. 4 is an end view of the torsion bar according to another aspect of the disclosure.
Figure 3:
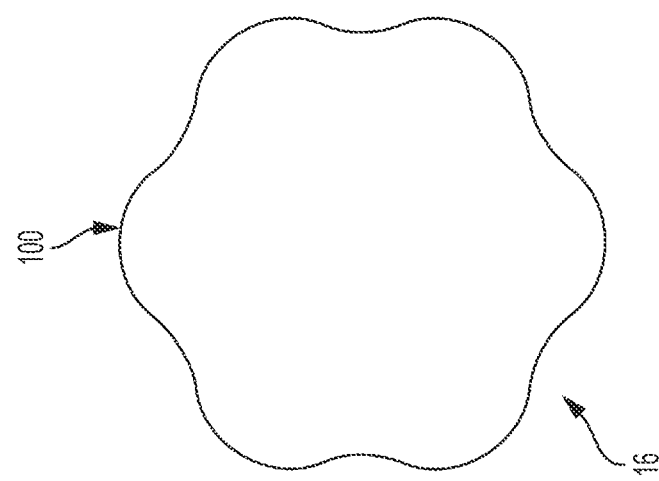
FIG. 3 is an end view of the torsion bar according to an aspect of the disclosure.

Referring now to FIGS. 1, 3 and 4, the central portion 20 of the torsion bar 16 is non-cylindrical in some embodiments, such that a cross-section of the central portion 20 is non-circular. The outer surface of the central portion 20 includes a plurality of lobes 100 extending in the axial direction of the central portion 20. FIGS. 3 and 4 illustrate two examples of different lobed embodiments to illustrate that the number of lobes may vary depending upon the particular application. It is to be appreciated that the illustrated embodiments are merely examples and that many other numbers of lobes are contemplated.

As with the splined outer surfaces 24, 32 of the end portions 22, 30, the plurality of lobes 100 are formed with a plurality of serrations and splines. In some embodiments, the plurality of lobes 100 extend along an entire length of the central portion 20. In such embodiments, the number and shape of the lobes 100 is identical to those of the splined outer surfaces 24, 32, such that the plurality of lobes 100 are circumferentially aligned with the splines of the splined outer surface 24 or 32 of one or both of the end portions 22, 30. This is done feasibly and in a cost-effective manner by forming the entire torsion bar 16 with an extrusion or drawing manufacturing process to define the lobes 100 and the splines of the end portions 22, 30, with the annular grooves 40, 42 then formed thereafter. In such embodiments, the end portions 22, 30 each have a respective diameter equal to a central portion diameter, in contrast to common torsion bars with "barbell" configuration having end portions larger in diameter than central portions.

Although illustrated and described above as embodiments with a common diameter of the central portion 20 and the end portions 22, 30, alternative embodiments include forming the annular grooves 40, 42 as a single annular groove by machining a groove that extends along an axial length that spans the torsion bar 16 from the first end portion 22 to the second end portion 30. In such an embodiment, the torsion bar 16 is received after forming the splines or lobes along an entire length thereof, and the end portions remain after removing material axially therebetween, such that a barbell structure is present.

Figure 5:
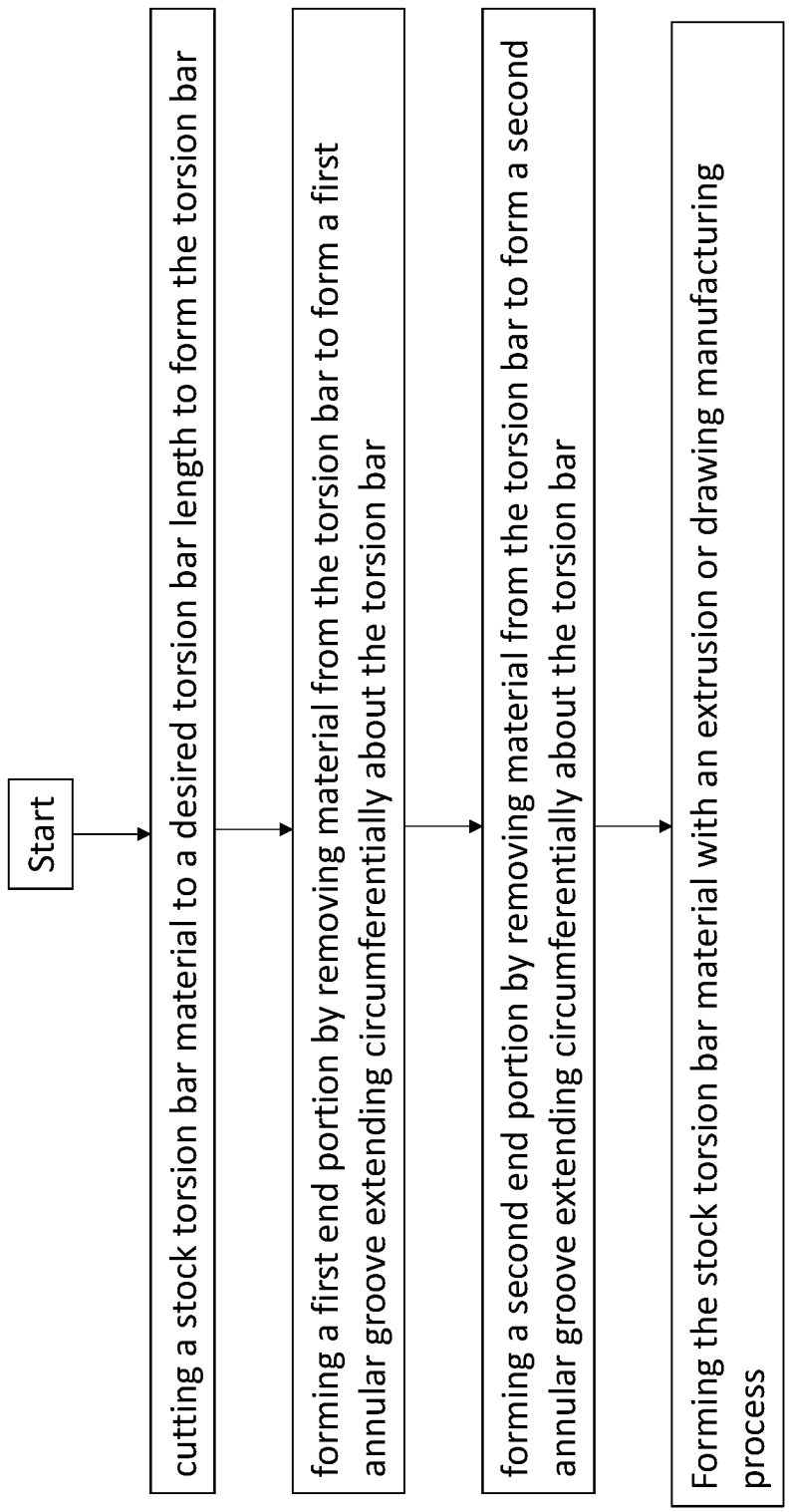
FIG. 5 is a flow diagram illustrating a method of manufacturing the torsion bar.

The embodiments described herein facilitate a simplified and less costly manufacturing process, as shown in FIG. 5. In particular, the torsion bar 16 includes the lobes (i.e., serrations and splines) included in the incoming blank material. This is done so that the torsion bar 16 can either be extruded or drawn. Upon formation of the blank, the torsion bar blank is cut to a desired length of the individual torsion bar 16. Once cut to a desired length, the annular grooves 40, 42 are formed with any suitable material removal process, such as a turning process. Any residual chips or dust from the cutting and/or material removal process are then removed. Finally, a heat treatment is utilized increase the hardness of the material for reduced hysteresis. Therefore, significantly fewer steps and costly machinery associated with torsion bar manufacturing are avoided, when compared to previously known torsion bars.

The embodiments described herein reduce the active length variation which in turn reduces the spring rate variation of the torsion bar 16.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A method of manufacturing a torsion bar comprising:
   cutting a stock torsion bar material to a desired torsion bar length to form the torsion bar;
   forming a first end portion by removing material from the torsion bar to form a first annular groove extending circumferentially about the torsion bar; and
   forming a second end portion by removing material from the torsion bar to form a second annular groove extending circumferentially about the torsion bar, wherein at least one of the first annular groove and the second annular groove extends completely circumferentially about the torsion bar.

2. The method of claim 1, wherein the stock torsion bar material is received with a plurality of lobes extending axially along the torsion bar, the stock torsion bar material formed with an extrusion or drawing manufacturing process.

* * * * *